United States Patent [19]

Glenn et al.

[11] Patent Number: 5,048,913

[45] Date of Patent: Sep. 17, 1991

[54] OPTICAL WAVEGUIDE EMBEDDED TRANSVERSE SPATIAL MODE DISCRIMINATION FILTER

[75] Inventors: William H. Glenn, Vernon; William W. Morey, West Hartford; Gerald Meltz, Avon, all of Conn.

[73] Assignee: United Technologies Corporation, Hartford, Conn.

[21] Appl. No.: 457,043

[22] Filed: Dec. 26, 1989

[51] Int. Cl.⁵ .............................................. G02B 6/34
[52] U.S. Cl. ...................................................... 385/37
[58] Field of Search ...................................... 350/96.19

[56] References Cited

U.S. PATENT DOCUMENTS

| | | | |
|---|---|---|---|
| 3,674,335 | 7/1972 | Ashkin et al. | 350/96.19 |
| 3,814,498 | 6/1974 | Tomlinson et al. | 350/96.19 |
| 3,891,302 | 6/1975 | Dabby et al. | 350/96.19 |
| 4,262,996 | 4/1981 | Yao | 350/96.19 |
| 4,743,087 | 5/1988 | Utaka et al. | 350/96.19 |
| 4,747,654 | 5/1988 | Yi-Yan | 350/96.19 |
| 4,760,569 | 7/1988 | Mahlein | 350/96.19 |
| 4,884,868 | 12/1989 | Bohm | 350/96.19 |
| 4,935,930 | 6/1990 | Handa | 350/96.19 |
| 4,942,366 | 7/1990 | Toda | 350/96.19 |

Primary Examiner—William L. Sikes
Assistant Examiner—Robert E. Wise
Attorney, Agent, or Firm—Peter R. Ruzek

[57] ABSTRACT

An optical waveguide mode discrimination light filtering arrangement inclues an optical waveguide having an elongated multimode core, and a cladding that guides at least two modes of light of a given frequency in an elongated path along a longitudinal axis of said core. At least one grating region is embedded in the core at a location remote from the end portions of the core and has a multitude of grating elements extending with a substantially equal longitudinal spacing substantially normal to the longitudinal axis to reflect light propagating in the path and reaching the grating elements back into the path for longitudinal propagation therein opposite to the original propagation direction. The spacing of the grating elements is so related to the axial wavelength of one of the modes that the reflected light of the one mode interferes constructively while the light of any other of the modes passes through the grating region in the original propagation direction substantially without attenuation.

2 Claims, 1 Drawing Sheet

OPTICAL WAVEGUIDE EMBEDDED TRANSVERSE SPATIAL MODE DISCRIMINATION FILTER

TECHNICAL FIELD

The present invention relates to optical filters in general, and more particularly to optical filters incorporated in optical waveguides.

BACKGROUND ART

There are already known various constructions of optical waveguides, such as optical fibers. Such optical waveguides guide light in a predetermined path, such as longitudinally through the optical fiber core. Depending on the cross-sectional area or diameter of the core with respect to the wavelength of the light launched into the core, the light is guided in the core in a single mode or in a multimode manner.

In some applications, it would be beneficial to be able to discriminate between the modes of light of a given frequency propagating in the waveguide core, that is, to treat them differently by reflecting at least one of such modes back to and out of the launching end of the core while letting the remaining mode or modes continue to propagate to the other end of the core in a substantially undisturbed manner. Yet, no one has proposed so far that and how this mode discrimination could be accomplished during the passage of the light of the given frequency in the core of a multimode optical waveguide or fiber.

It is also already known, for instance from the commonly owned U.S. Pat. No. 4,725,110, issued on Feb. 16, 1988, to impress periodic grating elements into the optical fiber core by exposing the core through the cladding to the interference pattern of two compatible coherent ultraviolet light beams that are directed against the optical fiber at two angles relative to the fiber axis that complement each other to 180°. This results in a situation where the grating elements, which are constituted by periodic index of refraction variations permanently induced in the core by exposure to the ultraviolet radiation interference pattern, are oriented normal to the fiber axis and are equidistantly longitudinally spaced from one another so that the grating consisting of such grating elements reflects, of the light launched into the fiber core for guided single mode propagation therein in a propagation direction, only that having a wavelength within a very narrow range, back along the fiber axis opposite to the original propagation direction so that such reflected light is guided in the core to the point at which the original light had been launched into the fiber core. On the other hand, this grating is transparent to single mode light at wavelengths outside the aforementioned narrow band so that it does not affect the further propagation of such other light. This patent, however, does not mention the possibility of using this technique for providing permanent grating elements of the above kind in the core of a multimode optical fiber and, consequently, does not address the consequences of the use of this technique in conjunction with multimode optical waveguides and the effect of the grating region produced in this manner on the propagating light of a given frequency.

Accordingly, it is a general object of the present invention to avoid the disadvantages of the prior art.

More particularly, it is an object of the present invention to provide an optical filter which does not possess the disadvantages of the known filters of this kind.

Still another object of the present invention is so to develop the optical filter of the type here under consideration as to be capable of discriminating between diverse transverse spatial modes of light at a given frequency.

It is yet another object of the present invention to devise an optical filter of the above type which reflects one mode of the light of the given frequency back to the point of origin while permitting substantially undisturbed passage of the remaining mode or modes of such light therethrough.

A concomitant object of the present invention is to design the mode discrimination optical filter of the above type in such a manner as to be relatively simple in construction, inexpensive to manufacture, easy to use, and yet reliable in operation.

Yet another object of the present invention is to accomplish the mode discrimination during the passage of the light through an optical waveguide.

Disclosure of the Invention

In keeping with these objects and others which will become apparent hereafter, one feature of the present invention resides in an optical waveguide mode discrimination light filtering arrangement which includes an optical waveguide having an elongated multimode core, and a cladding that guides at least two modes of light of a given frequency in an elongated path along a longitudinal axis of the core. At least one grating region is embedded in the core at a location remote from the end portions of the core and includes a multitude of grating elements extending with a substantially equal longitudinal spacing substantially normal to the longitudinal axis of the core. The grating elements reflect light propagating in the path and reaching them back into the path for longitudinal propagation therein opposite to the original propagation direction, and the spacing of the grating elements is so related to the axial wavelength of one of the modes that the reflected light of the one mode interferes constructively while the light of any other of the modes passes through the grating region in the original propagation direction substantially without attenuation.

BRIEF DESCRIPTION OF THE DRAWING

The present invention will be described in more detail below with reference to the accompanying drawing in which.

BEST MODE FOR CARRYING OUT THE INVENTION

Figure 1:
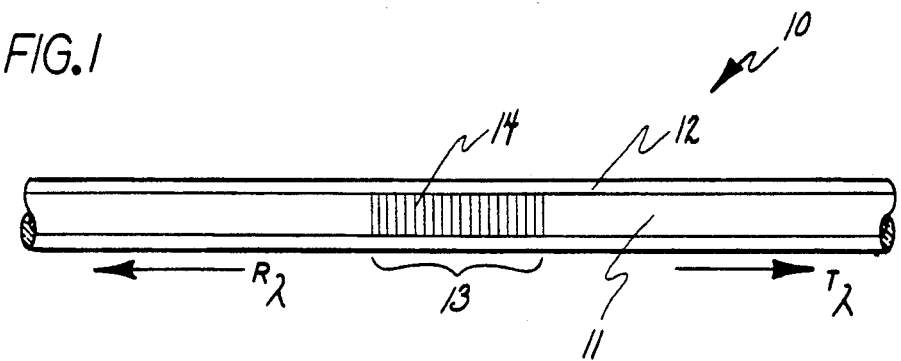
FIG. 1 is aside elevational view of an elongated section of a multimode optical fiber provided with a mode discrimination grating region filter of the present invention.

Referring now to the drawing in detail, and first to FIG. 1 thereof, it may be seen that the reference numeral 10 has been used therein to identify an optical waveguide. The waveguide 10 is shown to be configured as an optical fiber of which only a relatively short longitudinal portion is depicted and which includes a fiber core 11 and a fiber cladding 12 surrounding the fiber core 11. The fiber core 11 incorporates a grating region 13 that includes a multitude of grating elements 14 each extending substantially normal to the longitudinal axis of the core 11. The grating elements 14 are equidistantly spaced from one another as considered in the longitudinal direction of the optical fiber 10.

The grating elements 14 may be formed in the core 11 by the method disclosed in the aforementioned U.S. Pat. No. 4,725,110 the disclosure of which is incorporated herein by reference to the extent needed for understanding how the grating elements 14 of the optical waveguide of the present invention can be produced in the core 11. Basically, the core 11 is exposed, preferably through the cladding 12 without disturbing the latter, to an interference pattern resulting from the interference of two coherent ultraviolet radiation beams that are directed against the optical fiber 10 at respective angles with respect to the longitudinal axis of the core 11 that complement one another to 180°. Under these circumstances, the interference fringes (e.g. light intensity peaks) propagate through the fiber 10 in a direction normal to the longitudinal axis of the core 11 and induce in the core 11 permanent refractive index variations that constitute the respective grating elements 14. Consecutive ones of the grating elements 14 are present at the same periodic spacings throughout the grating region 13 but not in regions of the fiber core 11 that are longitudinally consecutive with the respective ends of the grating region 14.

According to the present invention, the core 11 that has the grating elements 14 permanently impressed or embedded therein, preferably by using the above technique, is capable of guiding more than one (the fundamental) mode of light of a given frequency, that is, it is a part of a multimode optical waveguide, particularly of the multimode optical fiber 10 in the illustrated example. Now, as the various transverse modes of the light having the given frequency travel in the longitudinal direction of the core 11, the axial wavenumber of any higher order mode is different from (lower than) that of the fundamental transverse mode of light of the same frequency.

Consequently, when the periodicity of the grating elements 14 of the grating region 13 is selected, for instance in the manner discussed in the aforementioned patent by appropriately selecting the angles of the inscribing beams and/or the wavelength of the ultraviolet radiation, so as to correspond to one-half of the wavelength of one of the modes (preferably the fundamental mode) propagating in the core 11 of the optical waveguide 10 constructed in accordance with the present invention, a minuscule portion of the light propagating through the multimode fiber core 11 is reflected back to the point of origin at each of the grating elements 14 as a result of the refractive index changes attributable to the presence of the grating elements 14. The cumulative effect of the grating elements 14 is the reflection of a significant proportion of the light, but only for that of the so reflected light the axial wavelength of which is in a very narrow range around a center wavelength $\lambda$ that is in a predetermined ratio to the periodicity of the grating elements 14, while all or substantially all of the remainder of the light guided in the multimode core 11 toward the grating region 13 passes or is transmitted through the grating region 13. In FIG. 1, the reflection of light in the selected axial wavelength range is indicated by an arrow $R_\lambda$, while the transmission of light outside this narrow range is indicated by an arrow $T_\lambda$.

Figure 2:
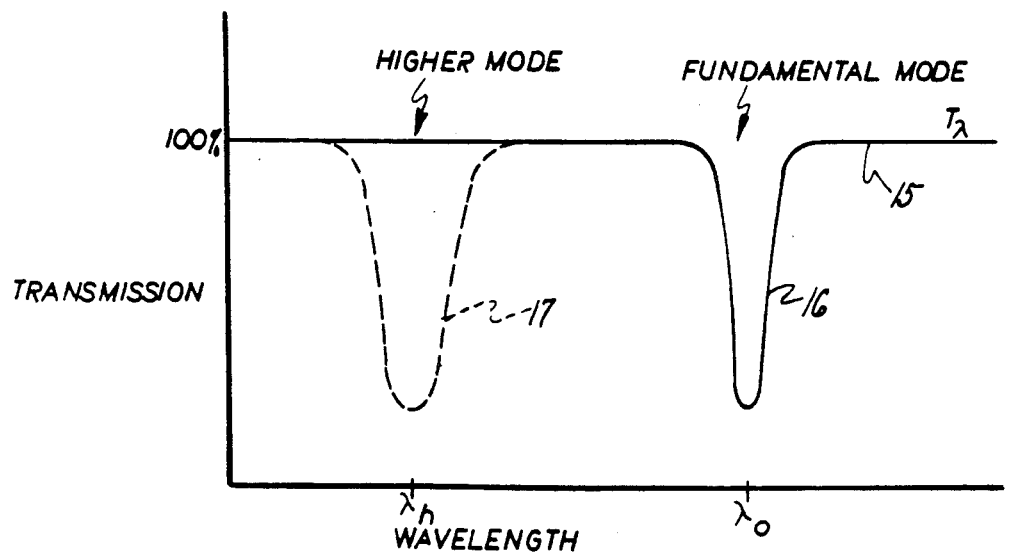
FIG. 2 is a graphic representation of the dependency of the transmissivity of the filter of FIG. 1 on axial wavelength, illustrating the different effect of the filter on two modes of light with the same frequency.

The effect of this axial wavelength selective reflection is illustrated in FIG. 2 which is a plot of the fiber transmission versus axial wavelength for an incorporated grating multimode optical fiber 10 with a certain grating element periodicity, under certain conditions of use. It may be seen there that a transmissivity curve 15 has a pronounced narrow notch or stopband 16 at $\lambda_o$ (of, say, about 576 nanometers). Experience with this type of embedded grating region optical fiber has shown that the light so removed from the transmissivity spectrum $T_\lambda$ as represented by the transmissivity curve 15 is in fact reflected, as $R_\lambda$, back to the point of origin.

It may be seen that, if the periodicity of the grating elements 14 is selected in such a manner, as postulated above, that the transmission notch 16 coincides with the axial wavelength of the fundamental mode of the guided light of a given frequency range (i.e. that centered about $\lambda = \lambda_o$), the next higher transverse mode of the light of the same given frequency range is centered about an axial wavelength $\lambda_h$ that is lower than the wavelength $\lambda_o$ to an extent sufficient to be outside the transmission notch 16, as indicated by a broken line 17. Consequently, the grating region 13 is substantially transparent to this higher transverse mode of the light of the given frequency so that this higher mode light will not be reflected back to the point of origin. Thus, it may be seen that the grating region 13 discriminates between the fundamental mode and the higher modes of the light of the given frequency by affecting them differently, that is, in the illustrated case, by reflecting the fundamental mode and letting the higher mode (or modes) pass without attenuating the same. Thus, the fundamental mode and the higher order mode (or modes) are effectively separated from one another so that each of them can be used for different purposes.

Evidently, while it is particularly advantageous when the grating region 13 constituting the transverse mode discrimination filter is directly embedded in an optical waveguide of a considerable length, preferably in the manner described above, the optical waveguide (fiber) section provided with the grating region 13 of the above kind in the above-described manner or in any other manner resulting in a grating region 13 having the properties described above, may constitute a separate component of an optical system cooperating with other components, such as single mode or multimode waveguides, of such optical system.

While the present invention has been illustrated and described as embodied in a particular construction of an optical waveguide with an embedded grating region, it will be appreciated that the present invention is not limited to this particular example; rather, the scope of protection of the present invention is to be determined solely from the attached claims.

We claim:

1. An optical waveguide transverse spatial mode discrimination light filtering arrangement comprising
   an optical waveguide including an elongated multimode core having two longitudinally spaced end portions, and capable of guiding at least two transverse spatial modes of light of a given frequency in an elongated path along a longitudinal axis of said core; and
   at least one grating region embedded in said core and having a multitude of grating elements extending with a substantially equal longitudinal spacing substantially normal to said longitudinal axis to reflect light propagating in said path and reaching said grating elements back into said path for longitudinal propagation therein opposite to the original propagation direction, said spacing being so related to the axial wavelength of one of said transverse spatial modes that the reflected light of said one transverse spatial mode interferes constructively while the light of any other of said transverse spatial modes passes through said grating region in said original propagation direction substantially without attenuation.

2. The arrangement as defined in claim 1, wherein said one transverse spatial mode is a fundamental transverse spatial mode at said given frequency.

* * * * *